US009141650B1

United States Patent
Nicks et al.

(10) Patent No.: US 9,141,650 B1
(45) Date of Patent: Sep. 22, 2015

(54) METHODS AND SYSTEMS FOR FILTERING TREE NODE DATA TO DETERMINE PART AND ASSEMBLY RELATIONSHIPS

(75) Inventors: Eric L. Nicks, O'Fallon, MO (US); Steven M. Gunther, O'Fallon, FL (US); James Michael Cress, Jr., Rolla, MO (US); Robert C. Thompson, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 862 days.

(21) Appl. No.: 13/312,389

(22) Filed: Dec. 6, 2011

(51) Int. Cl.
*G06F 17/30* (2006.01)

(52) U.S. Cl.
CPC .... *G06F 17/30292* (2013.01); *G06F 17/30327* (2013.01)

(58) Field of Classification Search
None
See application file for complete search history.

(56) References Cited

U.S. PATENT DOCUMENTS

| | | | |
|---|---|---|---|
| 6,356,880 B1 * | 3/2002 | Goossens et al. | 705/30 |
| 6,359,886 B1 | 3/2002 | Ujihara et al. | |
| 7,277,885 B2 * | 10/2007 | Eppley et al. | G06F 17/30 |
| 7,698,695 B2 | 4/2010 | Ganesh et al. | |
| 8,065,308 B2 | 11/2011 | Shadmon et al. | |
| 2004/0120330 A1 * | 6/2004 | Rhine et al. | 370/408 |
| 2009/0031230 A1 * | 1/2009 | Kesler | 715/764 |
| 2013/0060724 A1 * | 3/2013 | Jamriska et al. | 706/45 |

* cited by examiner

*Primary Examiner* — Son T Hoang
(74) *Attorney, Agent, or Firm* — Armstrong Teasdale LLP

(57) ABSTRACT

A computer-based method for generating multi-generational relationships within a relational model. The method includes applying, with a processing device, a filter to parent node data and child node data in the relational model, the relational model stored in a computer memory, adding filtered data to a database within a computer memory via instructions executed by the processing device, the filtered data including relational model data that passed through the filter, and applying, through instructions executed by the processing device, a parent node selection process to every child node in the filtered data that is associated with a parent node record not conforming to the filter.

17 Claims, 7 Drawing Sheets

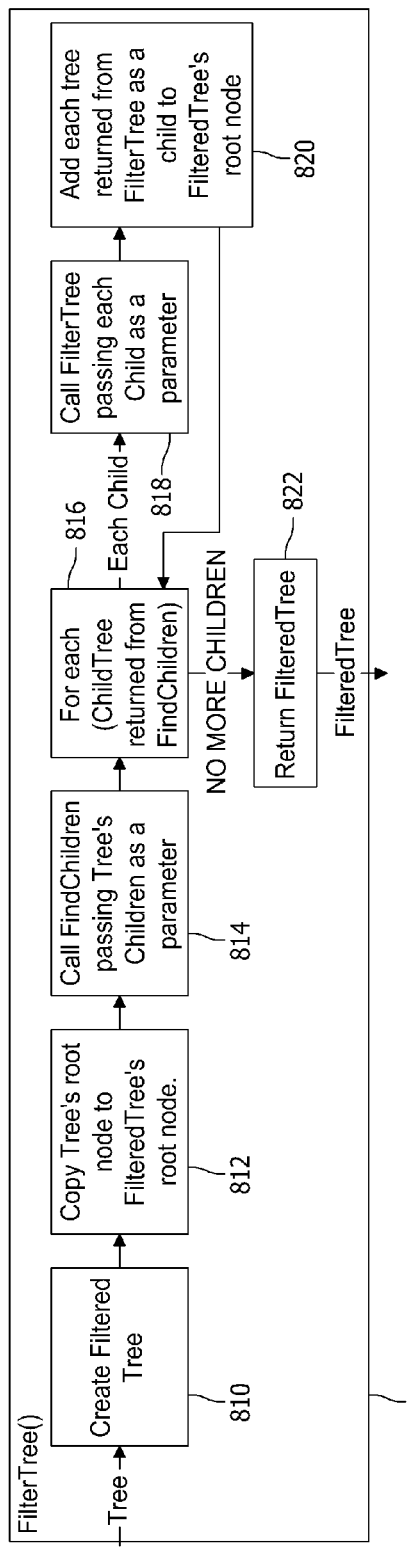
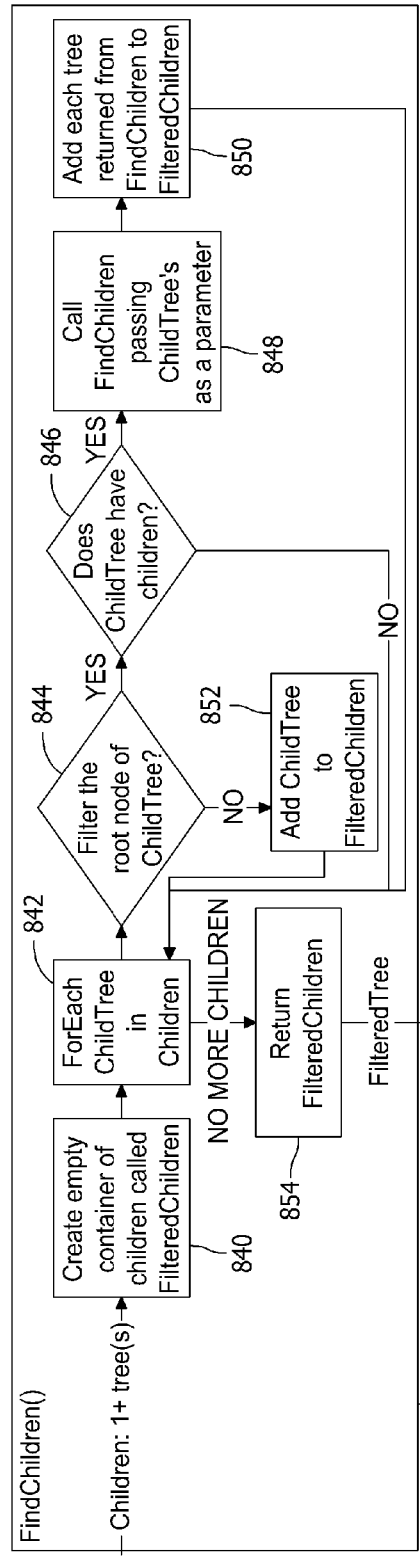
FIG. 8A
FIG. 8B

METHODS AND SYSTEMS FOR FILTERING TREE NODE DATA TO DETERMINE PART AND ASSEMBLY RELATIONSHIPS

BACKGROUND

The field of the disclosure relates generally to generating a capability to filter tree data, and more specifically, to methods and systems for filtering tree node data to determine parts and assembly relationships from a relational tree model.

There has been no way to filter out records from a parent/child data set (a relational data tree) while promoting some of their children (those that do not match the filter). As a result there has been no effective way to filter parts/assembly relationships from a relational tree model to help asset managers make inventory decisions. In certain large programs, such a technology would be of great benefit when attempting to manage parts in various stages of subassembly, which would allow asset managers to find way to disassemble/reassemble parts to solve inventory problems.

Within computer science tree algorithms, there are numerous methods to prune trees, however, these methods do not meet the requirements of the parts management problem.

BRIEF DESCRIPTION

In one aspect, a computer-based method for generating multi-generational relationships within a relational model is provided. The method includes applying, with a processing device, a filter to parent node data and child node data in the relational model, the relational model stored in a computer memory, adding filtered data to a database within a computer memory via instructions executed by the processing device, the filtered data including relational model data that passed through the filter, and applying, through instructions executed by the processing device, a parent node selection process to every child node in the filtered data that is associated with a parent node record not conforming to the filter.

In another aspect, a device is provided that includes a processing unit, and a data storage area configured to store a relational model including a tree including a plurality of parent nodes and child nodes that define an assembly. The device is programmed to apply a filter to parent node data and child node data in the relational model, add data output by the filter to a database within said data storage area, and apply a parent node selection process to every child node in the data output by the filter that is associated with a parent node that is not included in the data output by the filter.

In another aspect, one or more computer-readable storage media having computer-executable instructions embodied thereon are provided. When executed by at least one processor, the computer-executable instructions cause the at least one processor to apply a filter to parent node data and child node data in a relational model that includes a tree having a plurality of parent nodes and child nodes that define an assembly, add data output by the filter to a database, and apply a parent node selection process to every child node in the data output by the filter that is associated with a parent node that is not included in the data output by the filter.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 8A is a flowchart illustrating a first recursive method used to walk through the nodes of a parent/child tree.

FIG. 8B is a flowchart illustrating a second recursive method, called by the first recursive method FIG. 8A, and used to determine whether each node of the parent/child tree needs to be filtered and how to replace the node if it is filtered.

DETAILED DESCRIPTION

The described embodiments relate to generating a capability to filter tree data. Specifically, the described embodiments operate to filter out records from parent/child data. Given a relational tree model based on parent/child data, the described processes apply a filter to the parent/child data while maintaining multigenerational relationships.

In one exemplary application of the described embodiments, the described filtering of tree data allows asset managers to make faster inventory decisions. Parts/assembly relationships are filtered from a relational tree model that has been developed to help asset managers make inventory decisions. At least one result is that asset managers are able to find ways to disassemble and/or reassemble parts to solve inventory problems. Before development of the embodiments described herein, parts were tracked independently and relationships were ignored by the process. Generally, there have been no requirements to filter parts in a relational structure.

Figure 1:
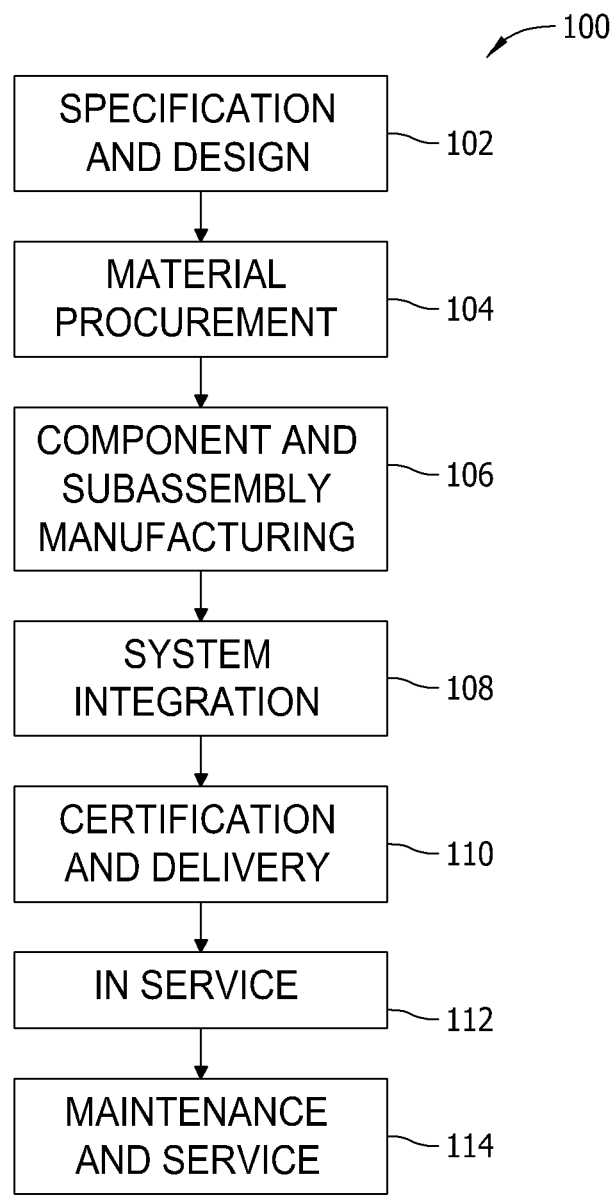
FIG. 1 is a flow diagram of an aircraft production and service methodology.
Figure 2:
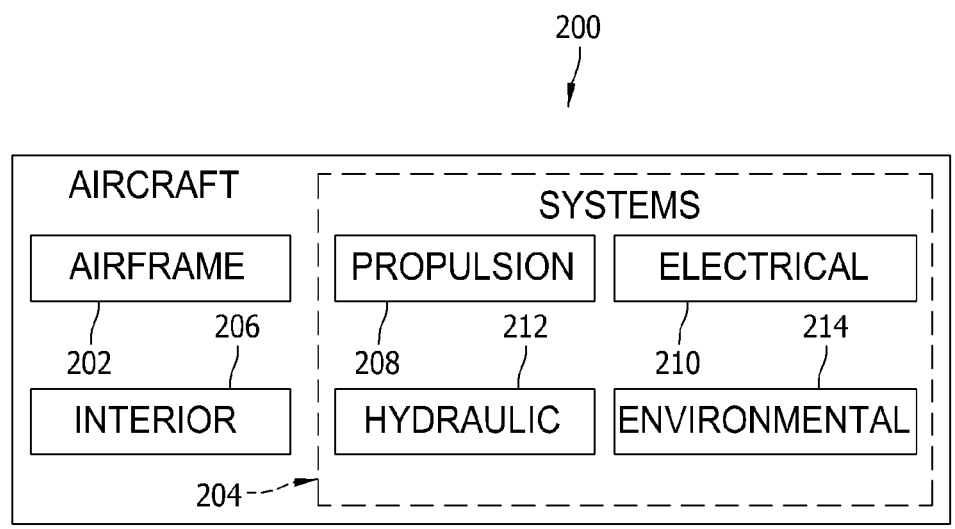
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
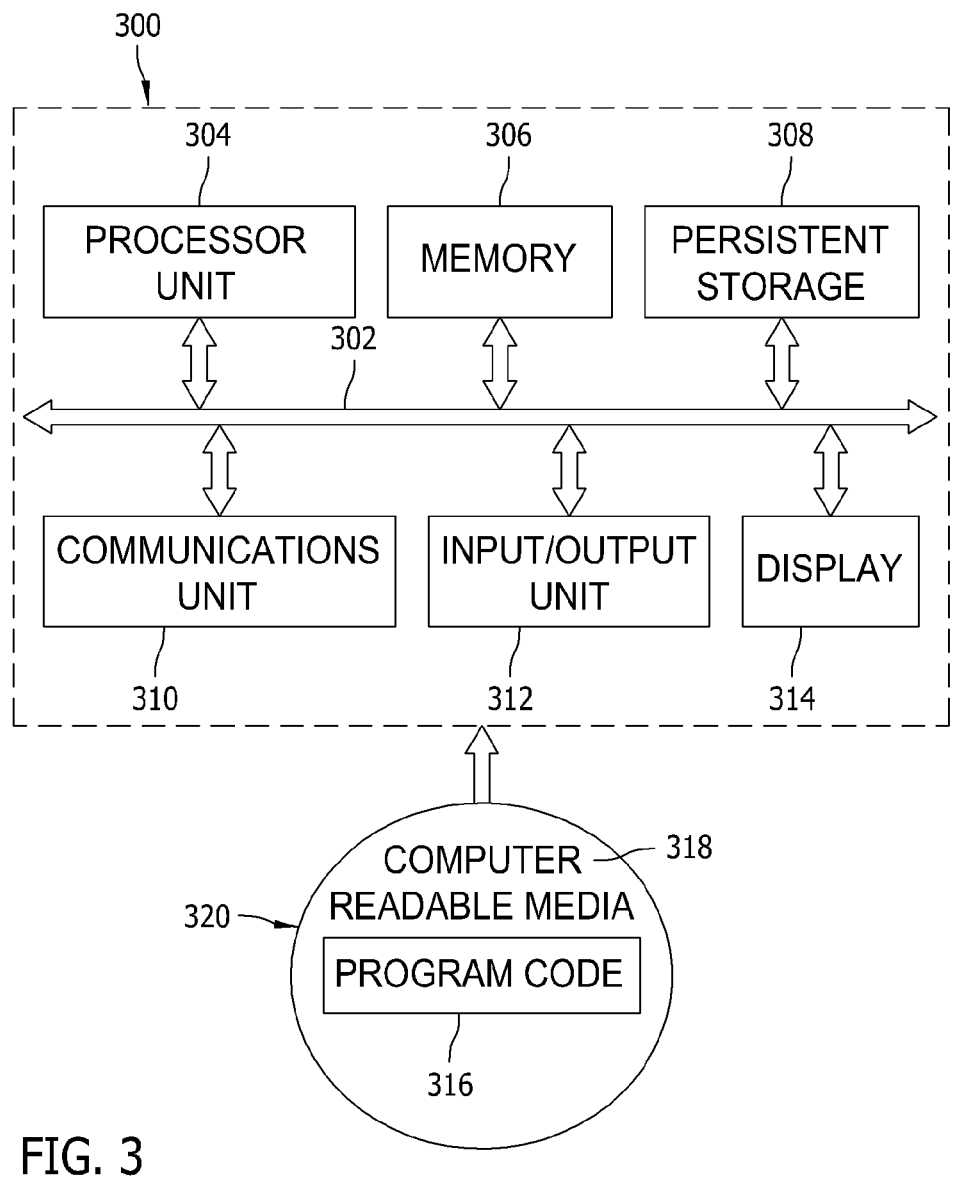
FIG. 3 is a diagram of a data processing system.

Turning now to FIG. 3, a diagram of a data processing system upon which the above described filtering processes might be executed is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
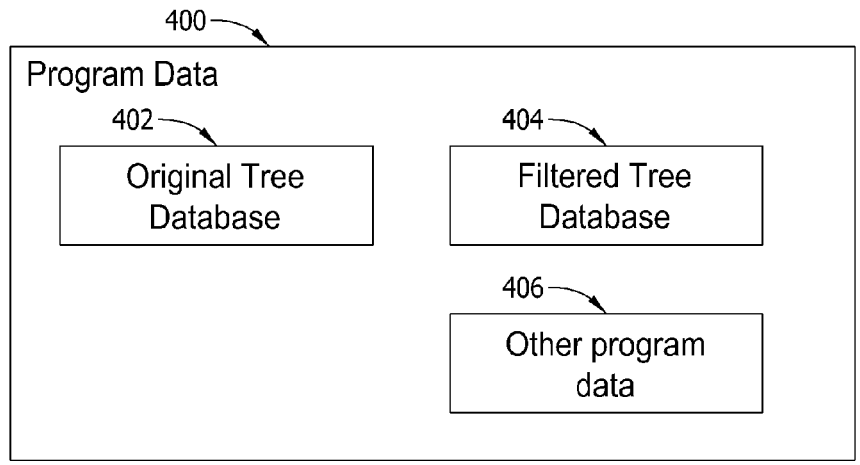
FIG. 4 is a block diagram of the data on which the process operates.

Within a storage device described above, there may be program data 400 as shown in FIG. 4. Program data 400 consists of either an original tree database 402, a filtered tree database 404, or both, and other program data 406. The filtered tree database 404 is created (or edited) by the process and may or may not be the same entity as the original tree database 402 was before the process was run.

Figure 5:
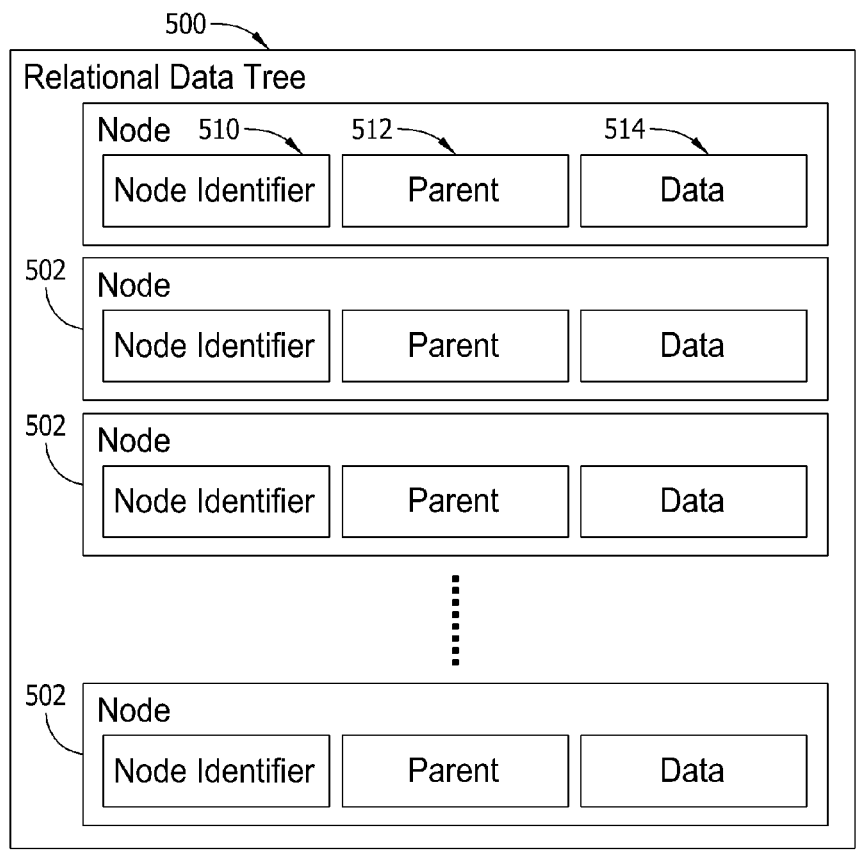
FIG. 5 is a diagram of a relational data tree.

Both the original tree database 402 and the filtered tree database 404, if they exist, are of the form of a relational data tree 500, which is shown in FIG. 5. The relational data tree 500 consists of one or more nodes 502. Each node 502 is a collection of data that includes a node identifier 510, a parent 512, and may include additional data 514. Each node identifier 510 in a relational data tree 500 is not the same data as any other node identifier 510 in the same relational data tree.

Each parent 512 either contains data that is the same as one of the node identifiers 510 of a different node 502 than of that of the node 502 containing the Parent 512 or contains another data value known as Null. Nodes 510 having a parent 512 that contains Null are sometimes referred to as root nodes or orphaned nodes.

Figure 6A:
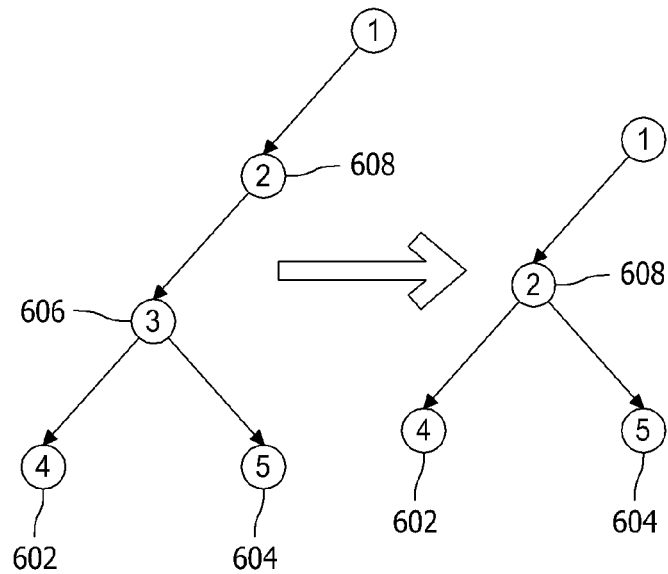
FIGS. 6A and 6B illustrates inheriting of child nodes of filtered nodes by parent nodes of the filtered nodes.
Figure 6B:
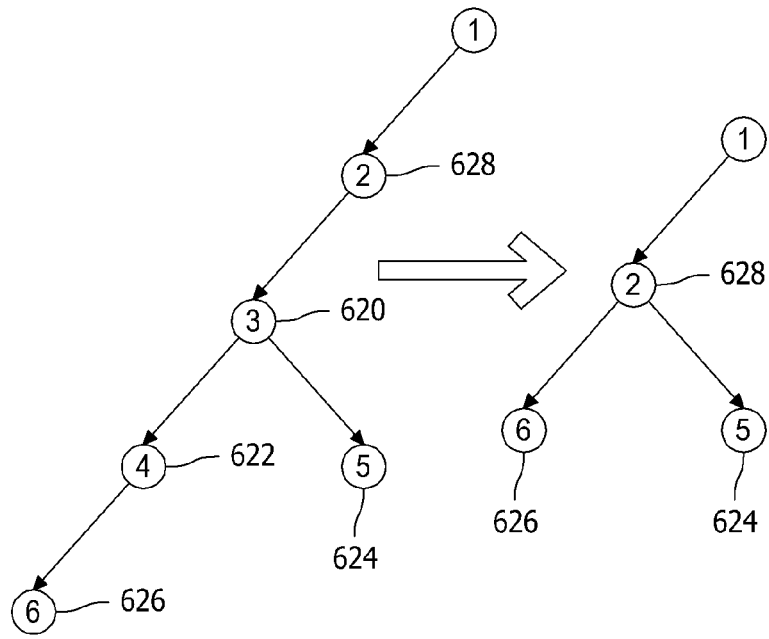

The processes described herein provide for the filtering of a relational data tree 500, specifically either creating a filtered tree database 404 using the original tree database 402 or modifying the original tree database 402 while retaining multigenerational relationships, as shown in FIGS. 6A and 6B. To retain multigenerational relationships means that all remaining nodes 502 of the filtered tree database 404 are the same as the original tree database 402 except the data contained within the parent 512 which is given by the following rules: the parent 512 of any node 502, hereafter called the child, (a) is the same as the parent 512 of the child within the original tree database 402, if the node 502 that is the same as the parent 512 is in the filtered tree database 404; (b) if not, then it is the same as the parent 512 of the node 502, hereafter referred to as the eliminated, referenced by the child's parent 512 if the eliminated had been in the filtered tree database 404 and these rules held. If no such parent 512 satisfies both rules (a) and (b) then the parent of the child is Null.

Examples of this process are shown in FIGS. 6A and 6B. In FIG. 6A, nodes 602, 604, 606, 608, represent nodes 502 of a first relational data tree 500 and node 620, 622, 624, 626, 628 represent nodes 502 of a second relational data tree 500. Arrows point toward the node 502 or child and from the node 502 that is the same as the parent 512 of the child.

In both FIGS. 6A and 6B, the left side of the figure shows the original tree database 402 before the process beings and the right side of the figure shows the filtered tree database 404 after the process completes, or returns.

Nodes 502 that appear in the left side but not in the right side are filtered. For example, node 606 in FIG. 6A has been identified to be filtered; therefore the algorithm promotes both child nodes 602 and 604 to be children of the parent node 608 of the filtered node 606.

Another example is shown in FIG. 6B. Nodes 620 and 622 have been identified to be filtered; therefore the algorithm promotes the child nodes 624 and 626 to be children of the parent node 628 of the filtered node 620. In this example, node 620 is identified as a parent node of node 622, but also identified as a child node of node 628.

Figure 7:
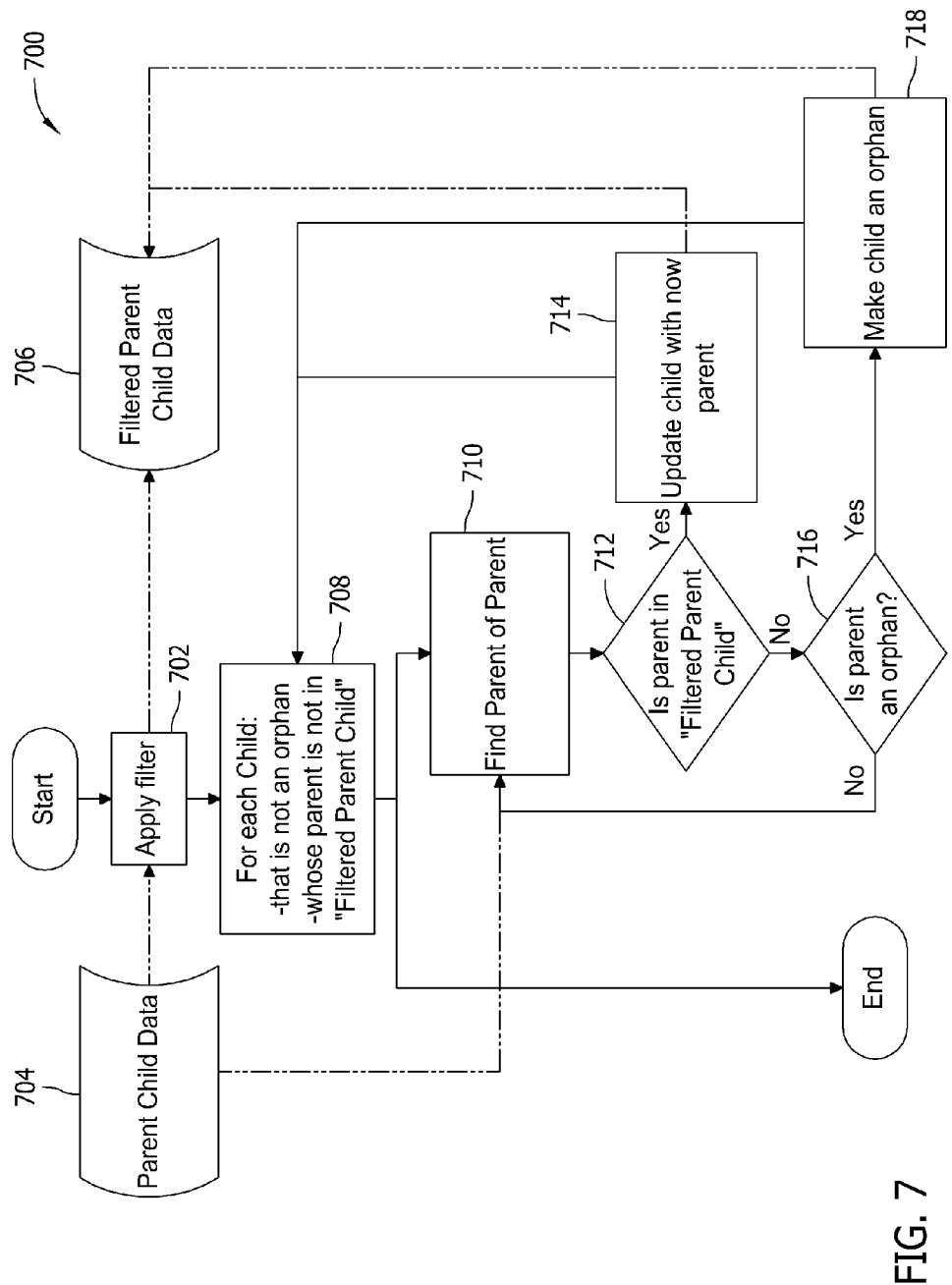
FIG. 7 is a flowchart of a process for filtering a relational model while maintaining multigenerational relationships.

The process 700, shown in FIG. 7, implements this process, that is, it filters a relational model, while retaining multigenerational relationships. The process 700 begins by copying and filtering 702 the parent child data 704, which represents the original tree database 402, into the filtered parent child data 706, which represents the filtered tree database 404, using a standard filtering mechanism, for example a SQL select statement.

To do the modification, every node 502 or child in the filtered data 706 that is associated with a parent record not conforming to the filter goes through a new parent selection process 708. The parent 512 of the node 502 referenced by the parent 512 of the child is found 710 up in parent child data 704 in the relational model and becomes the potential new parent record. If this potential new parent 712 is in the "Filtered Parent Child" database 706, the database is edited 714 to so the parent 712 of the child references this potential new parent record. Otherwise, if 716 this parent is itself an orphan then the child now becomes 718 an orphan. Finally, if neither is true, the parent of the potential new parent becomes the potential new parent. Once all children without filtered parents have been assigned new parents (or orphaned), the algorithm is complete. The "Filtered Parent Child" database 706 contains the desired results.

A second process 800 for accomplishing the relational filter is shown in FIGS. 8A and 8B. This process 800 includes an algorithm that is separated into two separate recursive methods, 802 and 804 respectively. The first recursive method 802, sometimes referred to as FilterTree 802 and shown in FIG. 8A, is used to walk the parent/child tree (such as shown in Figured 6A and 6B. FilterTree 802 calls the second recursive method 804, sometimes referred to as FindChildren 804, to determine whether each node needs to be filtered and how to replace the node if it is filtered.

Referring to FilterTree 802, a filtered tree is created 810 and a root node of the tree is copied 812 to the root node of the filtered tree. FindChildren 804 is called 814, passing the tree's children as a parameter. For each child tree returned 816 from FindChildren 804, FilterTree 802 is recursively called 818, passing each child as a parameter. Each tree returned from FilterTree 802 is added 820 as a child to FilteredTree's root node. When there are no more children, Filtered Tree 802 returns 822.

FindChildren 804, shown in FIG. 8B, checks the first level of the tree provided to the function as an input parameter to see if any of the nodes at that level are filtered. If any of the nodes are filtered, it starts traversing down that branch of the tree until it finds unfiltered children node(s) to replace the filtered node. It then replaces the filtered node with unfiltered children, and returns that tree. More specifically, when FindChildren 804 is called, it begins execution by creating 840 an empty container of children called, for example, FilteredChildren. For each ChildTree 842 in Children, the root node of ChildTree is filtered 844, and if 846 the ChildTree has children, FindChildren 804 is recursively called 848, passing ChildTree's children as a parameter. Each tree returned from FindChildren 804 is added 850 to FilteredChildren, and the process resumes to check for another ChildTree 842 in Children. If the root node of ChildTree cannot be filtered, ChildTree is added 852 to FilteredChildren and the process resumes to check for another ChildTree 842 in Children. If the ChildTree does not have 846 children, the process returns to check for another ChildTree 842 in Children. When there are no more children, FilteredChildren is returned 854 to FilteredTree 802.

This provides a relational model that can then be used to make more cost effective supply chain management decisions (e.g. inventory management) The relational model gives asset managers insight into the option of assembling/disassembling inventory to create parts of which they may be in need.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for generating multi-generational relationships within a relational model, the method comprising:
   applying, with a processing device, a filter to parent node data and child node data in the relational model to produce filtered data, the relational model comprises relational model data stored in a computer memory and is structured as a first tree;
   adding the filtered data to a database within the computer memory via instructions executed by the processing device, the filtered data including a subset of the relational model data that passed through the filter, wherein the filtered data is structured as a second tree;
   applying, through instructions executed by the processing device, a parent node selection process to every child node in the filtered data that is associated with a parent node record not conforming to the filter, wherein the applying comprises:
   creating the second tree;
   copying a root node of the first tree to a root node of the second tree;
   passing the plurality of child nodes of the first tree as a parameter to an algorithm;
   adding each tree returned from the algorithm as a child node to the root node of the second tree;
   checking a first level of the first tree provided as an input parameter to see if any node in the first level is filtered;
   for any filtered node, traversing down a branch of the first tree until unfiltered child nodes are found to replace the filtered node; and
   replacing the filtered node with the unfiltered child nodes in the branch.

2. The computer-based method according to claim 1 wherein the applying the filter to the parent node data and the child node data in the relational model comprises using a structured query language (SQL) SELECT statement to filter the parent node data and the child node data.

3. The computer-based method according to claim 1, wherein the applying the parent node selection process to every child node in the filtered data comprises:
   finding a parent node for a particular node indicated as being a particular parent of a particular child node in the relational model;
   setting the found parent node to be a potential new parent node for the particular child node; and
   if the potential new parent node is within the filtered data, editing the database to associate the particular child node with the found parent node,
   if the potential new parent node is not within the filtered data, setting the particular child node to be an orphan within the database.

4. The computer-based method according to claim 1, wherein the applying the parent node selection process to every child node in the filtered data comprises promoting all child nodes of any parent nodes that are removed through application of the filter to a particular parent node of the nodes that are removed through application of the filter.

5. The computer-based method according to claim 1, wherein:
   the applying the filter to the parent node data and the child node data in the relational model comprises recursively reviewing the first tree, wherein the first tree includes a plurality of parent nodes and a plurality of child nodes; and
   the adding the filtered data to the database comprises recursively determining whether each node in the first tree needs to be filtered and how to replace the node if it is filtered.

6. The computer-based method according to claim 1, wherein the parent node data and the child node data are representative of aircraft parts.

7. The computer-based method according to claim 1, wherein the applying the filter to the parent node data and the child node data in the relational model comprises using a structured query language (SQL) SELECT statement to filter the parent node data and the child node data.

8. A device for generating multigenerational relationships within a relational model comprising:
   a processing unit;
   a data storage area configured to store the relational model including a first tree including a plurality of parent nodes and a plurality of child nodes that define an assembly, the device programmed to:
   apply a filter to parent node data and child node data in the relational model;
   add output data from the filter to a database within the data storage area, wherein the output data is structured as a second tree; and
   apply a parent node selection process to every child node in the output data that is associated with a parent node that is not included in the output data, wherein the applying comprises:
   creating the second tree;
   copying a root node of the first tree to a root node of the second tree;
   passing the plurality of child nodes of the first tree as a parameter to an algorithm;
   adding each tree returned form the algorithm as a child node to the root node of the second tree;
   checking a first level of the first tree provided as an input parameter to see if any node in the first level is filtered;
   for any filtered node, traversing down a branch of the first tree until unfiltered child nodes are found to replace the filtered node; and replacing the filtered node with the unfiltered child nodes in the branch.

9. The device according to claim 8 wherein to apply the parent node selection process to every child node in the output data, the device is programmed to:
    find a parent node for a particular node indicated as being a particular parent node of a particular child node in the relational model;
    set the found parent node as a potential new parent record for the particular child node; and
    if the found parent node is within the filtered data, editing the database to associate the particular child node with the found parent node,
    if the found parent node is not within the filtered data, setting the particular child node to be an orphan within the database.

10. The device according to claim 8, wherein to apply the parent node selection process to every child node in the output data, the device is programmed to promote all child nodes of any parent nodes that are removed through application of the filter to a particular parent node of nodes that are removed through application of the filter.

11. The device according to claim 8 wherein the device is programmed to:
    apply the filter to the parent node data and the child node data in the relational model by recursively reviewing the first tree; and
    add the output data to the database by recursively determining whether each node in the first tree needs to be filtered and how to replace the node if it is filtered.

12. The device according to claim 8, wherein the plurality of parent nodes and the plurality of child nodes that define the assembly represent aircraft components.

13. The device according to claim 8, wherein to apply the filter to the parent node data and the child node data in the relational model, the device is programmed to use a structured query language (SQL) SELECT statement to filter the parent node data and the child node data.

14. One or more non-transitory computer-readable storage media having computer-executable instructions embodied thereon for generating multigenerational relationships within a relational model, wherein when executed by at least one processor, the computer-executable instructions cause the at least one processor to:
    apply a filter to parent node data and child node data in the relational model that includes a first tree having a plurality of parent nodes and a plurality of child nodes that define an assembly;
    add output data from the filter to a database, wherein the output data is structured as a second tree; and
    apply a parent node selection process to every child node in the data output by the filter that is associated with a parent node that is not included in the output data, wherein the applying comprises:
    creating the second tree;
    copying a root node of the first tree to a root node of the second tree;
    passing the plurality of child nodes of the first tree as a parameter to an algorithm;
    adding each tree returned from the algorithm as a child node to the root of the node of the second tree;
    checking a first level of the first tree provided as an input parameter to see if any node in the first level is filtered;
    for any filtered node, traversing down a branch of the first tree until unfiltered child nodes are found to replace the filtered node; and
    replacing the filtered node with the unfiltered child nodes in the branch.

15. The one or more non-transitory computer-readable storage media according to claim 14, wherein to apply the parent node selection process to every child node in the output data, the computer-executable instructions cause the at least one processor to:
    find a parent node for a particular node indicated as being a particular parent node of a particular child node in the relational model;
    set the found parent node as a potential new parent record for the particular child node; and
    if the found parent node is within the filtered data, editing the database to associate the particular child node with the found parent node,
    if the found parent node is not within the filtered data, setting the particular child node to be an orphan within the database.

16. The one or more non-transitory computer-readable storage media according to claim 14, wherein to apply a parent node selection process to every child node in the data output by the filter, the computer-executable instructions cause the at least one processor to promote child nodes of parent nodes that are removed through application of the filter to a parent node of the parent nodes that are removed through application of the filter.

17. The one or more non-transitory computer-readable storage media according to claim 14, wherein the computer-executable instructions cause the at least one processor to:
    apply the filter to the parent node data and the child node data in the relational model by recursively reviewing the first tree; and
    add output data to the database by recursively determining whether each node in the first tree needs to be filtered and how to replace the node if it is filtered.

* * * * *

UNITED STATES PATENT AND TRADEMARK OFFICE
CERTIFICATE OF CORRECTION

| | | |
|---|---|---|
| PATENT NO. | : 9,141,650 B1 | Page 1 of 1 |
| APPLICATION NO. | : 13/312389 | |
| DATED | : September 22, 2015 | |
| INVENTOR(S) | : Nicks et al. | |

It is certified that error appears in the above-identified patent and that said Letters Patent is hereby corrected as shown below:

On the title page item (75), line 2, should read --Steven M. Gunther, O'Fallon, IL (US)--

Signed and Sealed this
First Day of December, 2015

Michelle K. Lee
*Director of the United States Patent and Trademark Office*